US010823246B2

(12) United States Patent
Ryan et al.

(10) Patent No.: US 10,823,246 B2
(45) Date of Patent: Nov. 3, 2020

(54) PRECISION OPTICAL TABLETOP

(71) Applicant: Technical Manufacturing Corporation, Peabody, MA (US)

(72) Inventors: Steven T. Ryan, Newburyport, MA (US); John E. Booth, Newbury, MA (US); Michael Chamberlin, West Chesterfield, NH (US)

(73) Assignee: Technical Manufacturing Corporation, Peabody, MA (US)

( * ) Notice: Subject to any disclaimer, the term of this patent is extended or adjusted under 35 U.S.C. 154(b) by 0 days.

(21) Appl. No.: 15/769,375

(22) PCT Filed: Oct. 20, 2016

(86) PCT No.: PCT/US2016/057960
§ 371 (c)(1),
(2) Date: Apr. 19, 2018

(87) PCT Pub. No.: WO2017/070379
PCT Pub. Date: Apr. 27, 2017

(65) Prior Publication Data
US 2018/0313422 A1    Nov. 1, 2018

Related U.S. Application Data

(60) Provisional application No. 62/244,134, filed on Oct. 20, 2015.

(51) Int. Cl.
*F16F 7/12*    (2006.01)
*A47B 37/00*    (2006.01)
(Continued)

(52) U.S. Cl.
CPC .............. *F16F 7/121* (2013.01); *A47B 13/08* (2013.01); *A47B 37/00* (2013.01); *B01L 9/02* (2013.01);
(Continued)

(58) Field of Classification Search
CPC . F16F 7/121; B25H 1/02; A47B 13/08; A47B 37/00; A47B 2037/005;
(Continued)

(56) References Cited

U.S. PATENT DOCUMENTS 2,911,274 A * 11/1959 Grube .................. A47B 96/205
52/782.2
3,676,279 A *  7/1972 Beaver .................. A47B 13/08
428/73
(Continued)

FOREIGN PATENT DOCUMENTS

DE    203 16 081 U1    2/2004
EP     0 596 600 A1    5/1994
GB     2 175 199 A    11/1986

OTHER PUBLICATIONS

International Search Report and Written Opinion for Application No. PCT/US2016/057960 dated Jan. 16, 2017.
(Continued)

*Primary Examiner* — Mahammad Ijaz
(74) *Attorney, Agent, or Firm* — Wolf, Greenfield & Sacks, P.C.

(57) ABSTRACT

A precision tabletop for scientific instrumentation is described. The tabletop may be manufactured from as few as two pieces of material, include a honeycomb stiffening and vibration damping structure, be sealed from fluid ingress, include interior reinforcing structures, and permit accurate registration of machined features on all sides of the tabletop.

20 Claims, 5 Drawing Sheets

(51) Int. Cl.
| | |
|---|---|
| *A47B 13/08* | (2006.01) |
| *G01M 11/04* | (2006.01) |
| *B01L 9/02* | (2006.01) |
| *B25H 1/02* | (2006.01) |
| *F16B 5/01* | (2006.01) |

(52) U.S. Cl.
CPC .............. *B25H 1/02* (2013.01); *G01M 11/04* (2013.01); *A47B 2037/005* (2013.01); *A47B 2200/001* (2013.01); *B01L 2200/025* (2013.01); *B01L 2200/14* (2013.01); *F16B 5/01* (2013.01)

(58) Field of Classification Search
CPC .............. A47B 2200/001; B01L 9/02; B01L 2200/025; B01L 2200/14; G01M 11/04; F16B 5/01
USPC ............ 248/637, 678; 312/140.3, 209, 240; 428/73

See application file for complete search history.

(56) References Cited

U.S. PATENT DOCUMENTS

| | | | | |
|---|---|---|---|---|
| 5,154,963 | A * | 10/1992 | Terry | B32B 3/12 156/292 |
| 5,594,177 | A * | 1/1997 | Hanse | G01M 7/027 73/663 |
| 8,846,176 | B2 * | 9/2014 | Leng | B32B 3/12 428/116 |
| 2004/0141887 | A1 * | 7/2004 | Mainquist | B01L 3/50855 422/400 |
| 2005/0018742 | A1 * | 1/2005 | Hall | G01M 11/04 372/99 |
| 2005/0081760 | A1 | 4/2005 | Leng | |
| 2007/0144409 | A1 * | 6/2007 | Zhu | G02B 7/00 108/28 |
| 2013/0104780 | A1 * | 5/2013 | Zhu | G01M 11/04 108/28 |
| 2018/0313422 | A1 * | 11/2018 | Ryan | A47B 37/00 |

OTHER PUBLICATIONS

International Preliminary Report on Patentability for Application No. PCT/US2016/057960 dated May 3, 2018.

* cited by examiner

PRECISION OPTICAL TABLETOP

CROSS REFERENCE TO RELATED APPLICATION APPLICATIONS

This application is a national stage filing under 35 U.S.C. 371 of International Patent Application Serial No. PCT/US2016/057960, filed Oct. 20, 2016, entitled "Precision Optical Tabletop", which claims the benefit of U.S. Provisional Application No. 62/244,134, filed Oct. 20, 2015, titled "Precision Optical Tabletop," each of which is hereby incorporated by reference in its entirety.

BACKGROUND

Technical Field

The technology relates to vibration-damped, precision platforms for sensitive electro-optical systems and subsystems and instruments such as microscopes and laboratory equipment.

Discussion of the Related Art

It has long been recognized that stable, preferably vibration-free, platforms are needed for various types of scientific research, development, and manufacturing, such as in the fields of optics and microscopy. In the early $20^{th}$ century, laboratory tabletops were made of slabs of stone, and their sheer mass was relied upon for stability and suppressing any vibrations that may couple into the table. More recently, engineered platforms with passive or active vibration-damping systems have been developed and are available commercially for research and manufacturing purposes.

These engineered platforms include engineered tabletops. A conventional engineered tabletop 100 is depicted in FIG. 1A, and comprises a top skin 110 that is normally made of stainless steel. The top skin 110 may include an array of threaded holes 115 that are used to fasten scientific equipment securely to the tabletop. The threaded holes may be backed with cups 120 that help keep the tabletop clean (e.g., they help prevent spilled liquid or other contaminants from entering into the tabletop structure where it cannot be removed). Further details of cups and "clean top" structures are described in U.S. Pat. Nos. 4,645,171 and 5,558,920, which are both incorporated herein by reference. An engineered tabletop 100 may further include a honeycomb filler 140 and lower skin 150 that is also made of steel or stainless steel.

The honeycomb filler 140 typically comprises a webbing of thin steel walls with large voids between the walls, as depicted in FIG. 1B. The honeycomb filler is an engineered product that provides considerable stiffness to the tabletop, and accommodates the cups 120. For example, threaded holes 115 with cups 120 may be located on a regular grid pattern (e.g., on one-inch spacings) indicated by the crosses 112 in FIG. 1B.

SUMMARY

The inventors have conceived of a low-profile, vibration-damped tabletop that provides accurate registration of machined features on top, side, and bottom surfaces of the tabletop, interior reinforcing structures, a tailored honeycomb structure, and clean holes for fastening items to the table top. According to some embodiments, the tabletop can be made from as few as two pieces, includes a honeycomb structure to reduce weight and improve vibration-damping characteristics, includes tapped holes in a top skin or any surface for fastening optical components, and is sealed to prevent fluid spills from penetrating the honeycomb.

Some embodiments relate to a precision tabletop comprising a top body having a top surface and a bottom surface, a honeycomb structure formed or installed in the top body below the top surface, a solid region formed within the honeycomb structure that spans multiple honeycomb cells and extends from the top surface to the bottom surface, and a first machined feature formed on the bottom surface of the solid region that is registered to at least one machined feature formed on the top surface of the top body. In some aspects, the honeycomb structure and the solid region are formed into a same piece of material used to make the top body. In some implementations, the bottom surface of the solid region is parallel to the top surface of the top body to within ±0.01 radians.

In some aspects, a precision tabletop may further comprise a second machined feature formed on a side of the top body that is registered to at least one machined feature formed on the top surface of the top body. In some cases, the top body is formed from a metal. In some implementations, the honeycomb structure extends across at least one-quarter of the area of the top body. According to some aspects, the honeycomb cells have different sizes and/or shapes in different regions of the top body. In some aspects, ribs of the honeycomb cells have different thicknesses in different regions of the top body.

According to some implementations, a precision tabletop may further comprise backing regions at intersections of ribs in the honeycomb structure and blind holes formed in the backing regions. In some cases, a precision tabletop may further comprise one or more bottom plates adhered over the honeycomb region. In some aspects, a precision tabletop may further comprise bonding expansions at intersections of ribs in the honeycomb structure to which the one or more bottom plates are adhered.

Methods for manufacturing a precision tabletop are also described. Some embodiments relate to a method for forming a precision tabletop comprising acts of forming a honeycomb structure in at least one region of a top body core, wherein the honeycomb structure is formed below a top surface of the top body core; leaving a solid region spanning multiple honeycomb cell widths within the honeycomb structure; machining first features on the top surface of the top body core; and aligning and machining second features on a bottom surface of the solid region to be registered to at least one machined feature on the top surface. A method may further include machining the bottom surface of the solid region to be parallel to the top surface within ±0.01 radians. In some cases, a method of manufacturing a precision tabletop may also include aligning and machining third features on a side surface to be registered to at least one machined feature on the top surface.

In some aspects, forming the honeycomb structure comprises forming backing regions at intersections of ribs of the honeycomb structure, and further comprising forming blind holes in the backing regions. In some implementations, forming the honeycomb structure comprises forming bonding expansions at intersections of ribs of the honeycomb structure, and further comprising adhering a bottom plate to the bonding expansions.

The foregoing apparatus and method embodiments may be included in any suitable combination with aspects, features, and acts described above or in further detail below. These and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the embodiments may be shown exaggerated or enlarged to facilitate an understanding of the embodiments. The drawings are not necessarily to scale, emphasis instead being placed upon illustrating the principles of the teachings. In the drawings, like reference characters generally refer to like features, functionally similar and/or structurally similar elements throughout the various figures. Where the drawings relate to microfabricated circuits, only one device and/or circuit may be shown to simplify the drawings. In practice, a large number of devices or circuits may be fabricated in parallel across a large area of a substrate or entire substrate. Additionally, a depicted device or circuit may be integrated within a larger circuit.

When referring to the drawings in the following detailed description, spatial references "top," "bottom," "upper," "lower," "vertical," "horizontal," and the like may be used. Such references are used for teaching purposes, and are not intended as absolute references for embodied devices. An embodied device may be oriented spatially in any suitable manner that may be different from the orientations shown in the drawings. The drawings are not intended to limit the scope of the present teachings in any way.

Features and advantages of the illustrated embodiments will become more apparent from the detailed description set forth below when taken in conjunction with the drawings.

DETAILED DESCRIPTION

Figure 1A:
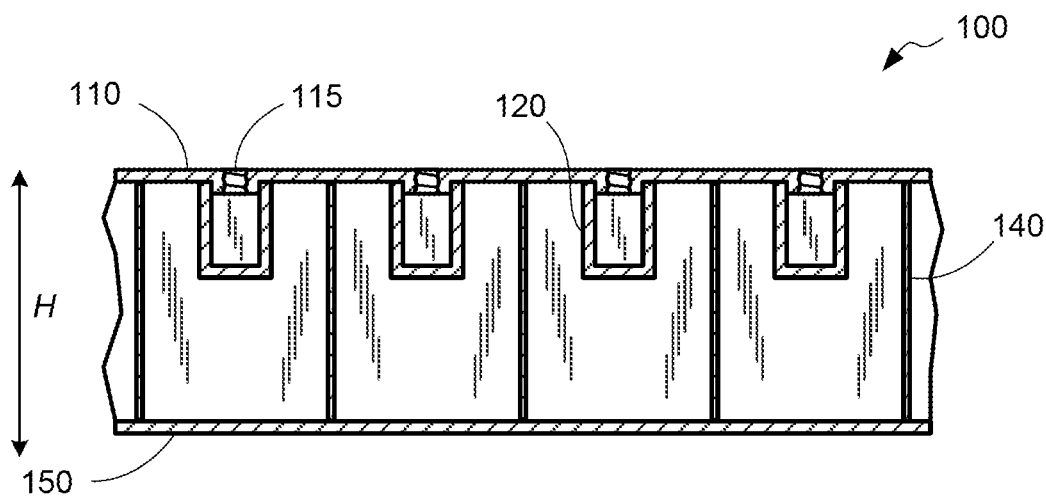
FIG. 1A depicts a honeycomb tabletop structure.

The inventors have recognized and appreciated that conventional tabletop structures, such as that depicted in FIG. 1A may not be best suited for certain precision applications. For example, some applications require tight dimensional tolerances for features or machined features on a top skin 110 relative to features or machined features on a bottom skin 150 of a tabletop. For example, holes for mounting optical components may need to be located precisely on top and bottom and/or side surfaces of the tabletop, and/or the two surfaces may need to be parallel within tight tolerances. Trying to meet parallelism for a structure shown in FIG. 1A by machining can lead to damage of the tabletop. For example, a significant amount of cutting fluid is required which can enter into the honeycomb structure, corrode the core, and/or degrade epoxy used to bond the top and bottom skins to the honeycomb. Also, heat from machining can weaken or damage the epoxy.

Although the honeycomb filler and tabletop design of FIG. 1A is suitable for many applications, it may not be suitable for some precision equipment applications where threaded holes need to be located in areas other than a regular array and located with precision on other surfaces of the tabletop. In some applications, tight dimensional tolerances may be required between features or machined features on one or both of the top and bottom surfaces of the tabletop 100 and features or machined features located on sidewalls of the tabletop. The inventors have found that material variances for conventional honeycomb tabletops, such as that depicted in FIG. 1A, can exceed the precision requirements for some applications, e.g., in the areas of precision optical systems, microtechnology, and nanotechnology. Also, if a user is careless when inserting a screw into a threaded hole 115, they can strip the threaded hole and/or damage the cup 120, potentially allowing spilled fluid to leak into the interior of the structure.

The inventors have conceived of a precision optical tabletop that, in some embodiments, may require only two pieces of material—a top body and a bottom skin or cover plate. The tabletop can include a honeycomb structure (to improve vibration-damping characteristics) which may be tailored to a specific application, machined features or other features on all surfaces of the tabletop that can meet demanding precision requirements, and be sealed to prevent fluid ingress to a honeycomb structure.

Figure 2:
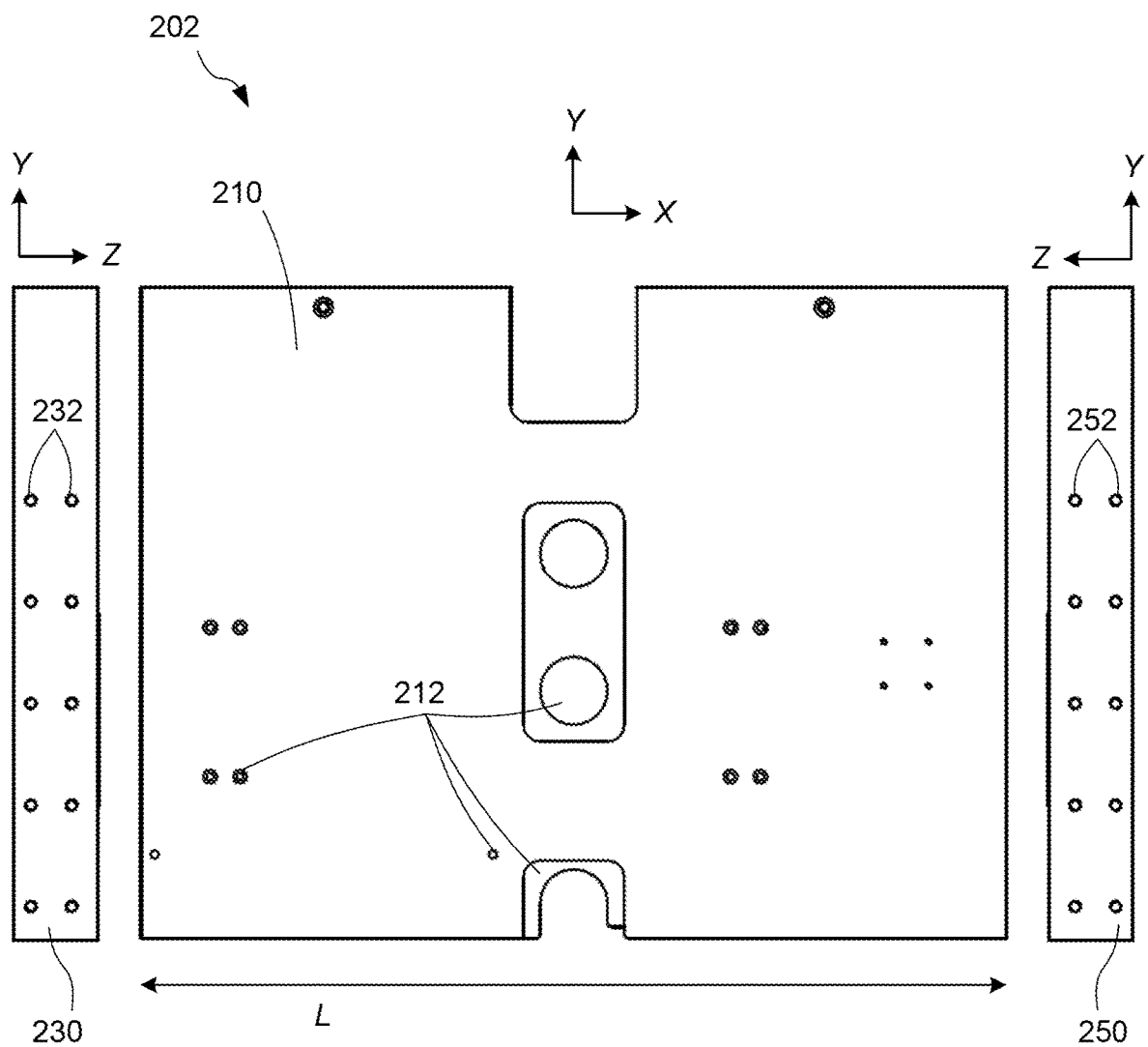
FIG. 2 depicts a plan view and edge views of a top body of a precision optical tabletop, according to some embodiments.

An example of a top body 202 of a precision tabletop is depicted in FIG. 2. The illustration includes a plan view of a top surface, a view of a left edge 230, and a view of a right edge 250. The top surface of the top body may include a first surface 210 and may include one or more additional machined surfaces (not shown) that can be parallel to the first surface but at different heights. In some implementations, an additional machined surface may be machined at an angle to the first surface 210. A length L of the tabletop may be between approximately 8 inches and approximately 36 inches, though other dimensions may be used in other embodiments. A width of the tabletop may be between approximately 8 inches and approximately 36 inches, according to some embodiments.

In some cases, a top body 202 may be formed from aluminum, alloys of aluminum, invar, plastic, carbon fiber, or any other suitable metallic, composite, or non-metallic material. For example, the top body may be machined from a single slab of suitable material. A top body may include a plurality of machined features 212. The machined features may include holes, through-holes, blind holes, tapped holes, grooves, trenches, pedestals, or any other suitable feature that may be formed in the top body by a machining process. The machined features may be used to mount, register, or align one or more optical components or other instruments or components to the tabletop. According to some embodiments, edges 230, 250 of the top body may also include machined features 232, 252. Because the top body 202 is formed from a block of material and the machined features 212 may be located with micrometer-scale precision with a machining process, the components that mount to the tabletop may be registered with respect to each other with a high degree of precision.

Figure 3:
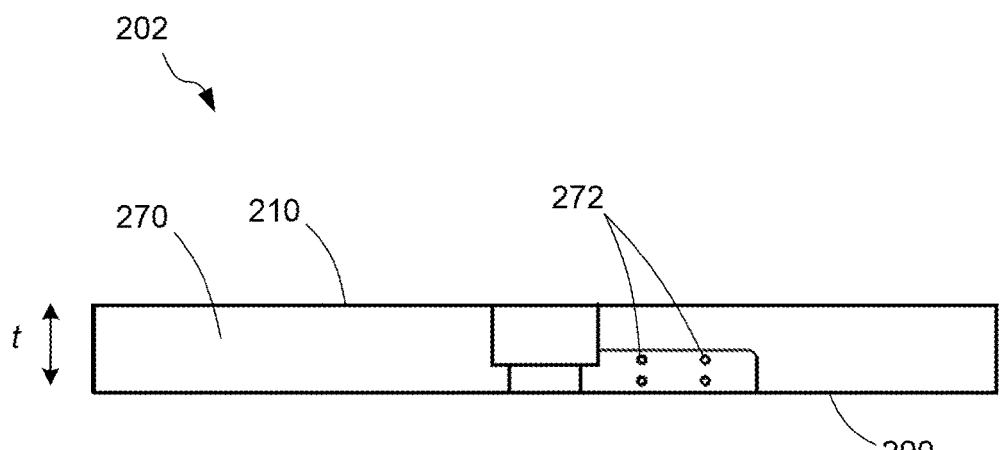
FIG. 3 depicts a front view of a top body of a precision optical tabletop, according to some embodiments.

FIG. 3 shows an elevation view of a top body 202 of a precision optical tabletop, according to some embodiments. A front edge 270 of the tabletop may also include machined features 272. According to some embodiments, machined features on any of the edge surfaces of the top body may be aligned with respect to machined features 212 on a top surface of the tabletop. For example, corners and surfaces of the top body may be used as reference points to obtain precise alignment between machined features on the top surfaces 210, side surfaces 230, 250, 270, and bottom surface 290 of the tabletop. A thickness t of the top body may be between approximately 1 inch and approximately 3 inches, though other thicknesses may be used in other embodiments.

Figure 4:
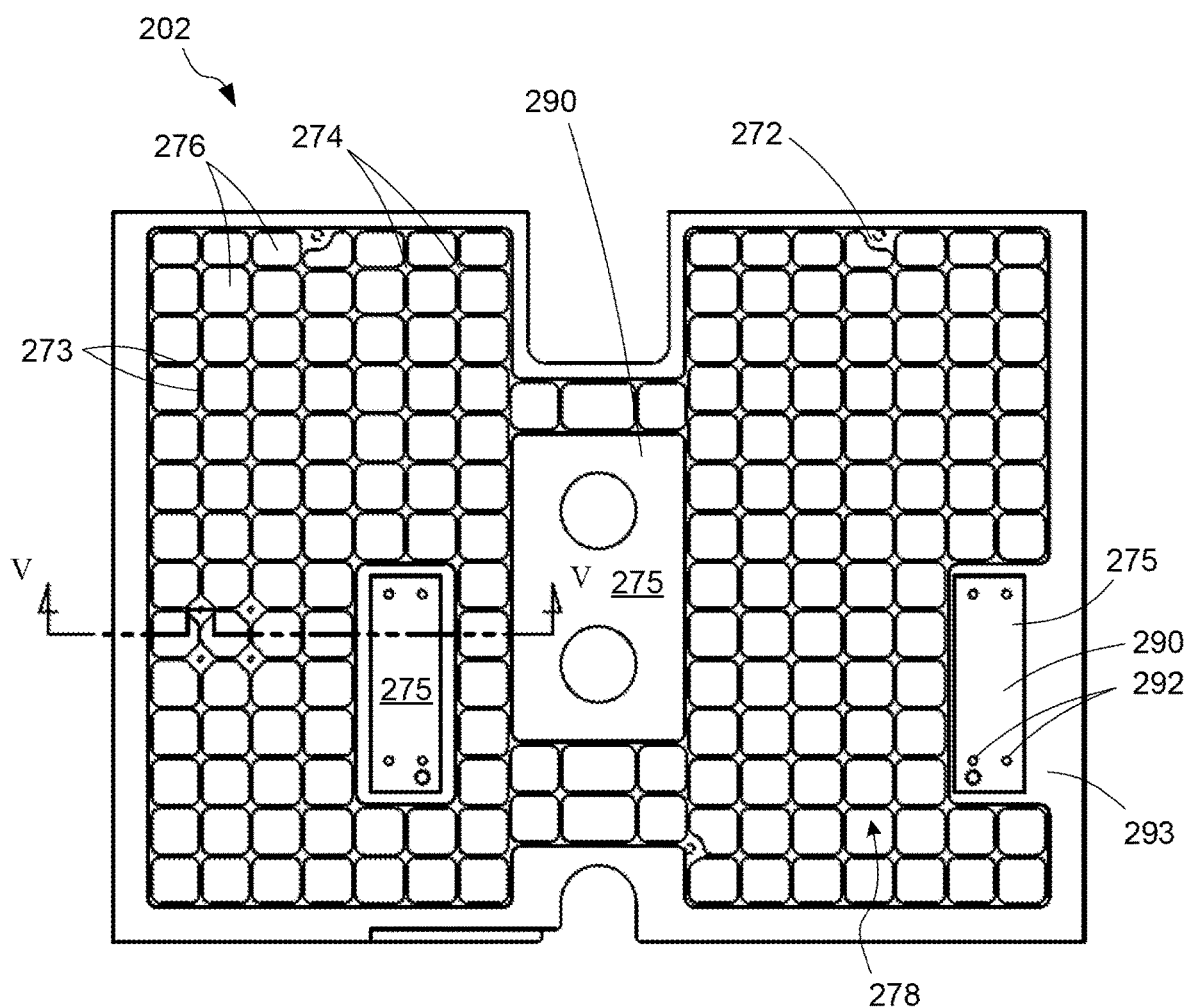
FIG. 4 depicts a bottom-side view of a top body of a precision optical tabletop, according to some embodiments.

A bottom view of the top body 202 is depicted in FIG. 4. According to some embodiments, voids 276 may be formed in the top body 202 below the top surface 210 to create a honeycomb structure 278 extending over at least a portion of the top body. The honeycomb cells may be of any suitable shape, such as square, rectangular, triangular, hexagonal, any polygon, circular, or oval. In some cases, a combination of shapes may be used. The honeycomb cells may extend over an area of the top body that is between about 25% and about 95%, in some cases. The honeycomb structure 278 reduces the weight of the tabletop, while maintaining a high stiffness of the tabletop. Because the mass is reduced, natural resonant vibration modes of the tabletop may be increased beyond 100 Hz or higher, making the tabletop less susceptible to coupling in environmental vibrations in low frequency ranges.

The inventors have further recognized and appreciated that honeycomb tabletops can be susceptible to delamination of a covering skin (e.g., the bottom skin) when fluid is spilled on the tabletop and ingresses into the honeycomb structure. Once in the honeycomb, the fluid can be hard or impossible to remove and may attack the core and any epoxy that is used to adhere a bottom skin. To avoid this potential problem, solid backing regions 272 may be left in the top body 202 into which blind tapped holes (for mounting optical components or other instruments or components) may be formed in the top surface. In addition to providing added strength for mounting components to the top surface of the tabletop, these blind holes prevent spills from entering into the honeycomb structure.

According to some embodiments, solid regions 275 may be left in the top body 202. A honeycomb structure may not be formed in these regions. These solid regions can provide additional strength for mounting the tabletop to a support, or mounting instruments to the tabletop. Additionally, through holes may be drilled through the solid regions 275 to provide top-surface-to-bottom-surface alignment or registration features. For example a through hole may be drilled through one or more of these solid regions 275, and registration pins inserted into the hole(s) to provide references for alignment of top surface and back surface features. In this manner, machined features 212 (and any component that mounts thereto) on the bottom surface 290 may be precisely aligned with reference to machined features on the top surface 210. As with the top surface, there may be one or more additional surfaces 293 on the bottom surface. For example, a solid region 275 may have a bottom surface 290 that protrudes beyond a peripheral surface 293.

An additional benefit of the top body 202 is that a hole pattern that does not comply with a regular or symmetric grid pattern for a conventional honeycomb core tabletop can be accommodated by the honeycomb structure in the top body. For example, the honeycomb cells of the top body 202 can be machined to avoid interference with any desired hole pattern. Accordingly, none of the machined holes, for example, would undesirably intersect ribs 273 of the honeycomb structure.

Figure 5:
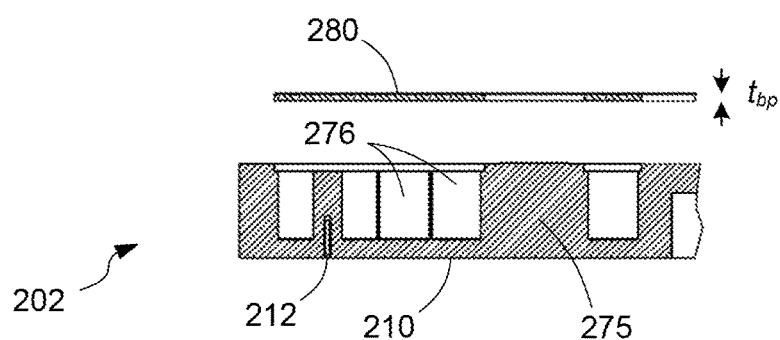
FIG. 5 depicts a cross-sectional view of a portion of a top body of a precision optical tabletop, according to some embodiments.

FIG. 5 depicts a cross-section view of the top body 202 of a precision tabletop, according to some embodiments. In this illustration, the top body is inverted, and the view is taken through the cut line IV shown in FIG. 4. The drawing shows solid regions 275 and a honeycomb region between the solid portions. One or more bottom plate covers 280 may be epoxied to the bottom side of the honeycomb regions to seal the underside of the honeycomb from any fluid ingress, and to add a shear layer that improves vibration damping of the tabletop. A thickness of the bottom plate may be between approximately 0.06 inches and approximately 0.5 inches. A bottom plate 280 may be fabricated from aluminum, alloys of aluminum, invar, plastic, carbon fiber, or any other suitable metallic, composite, or non-metallic material. In some embodiments, a bottom plate 280 may additionally be fastened to the top body 202 with screws.

Figure 1B:
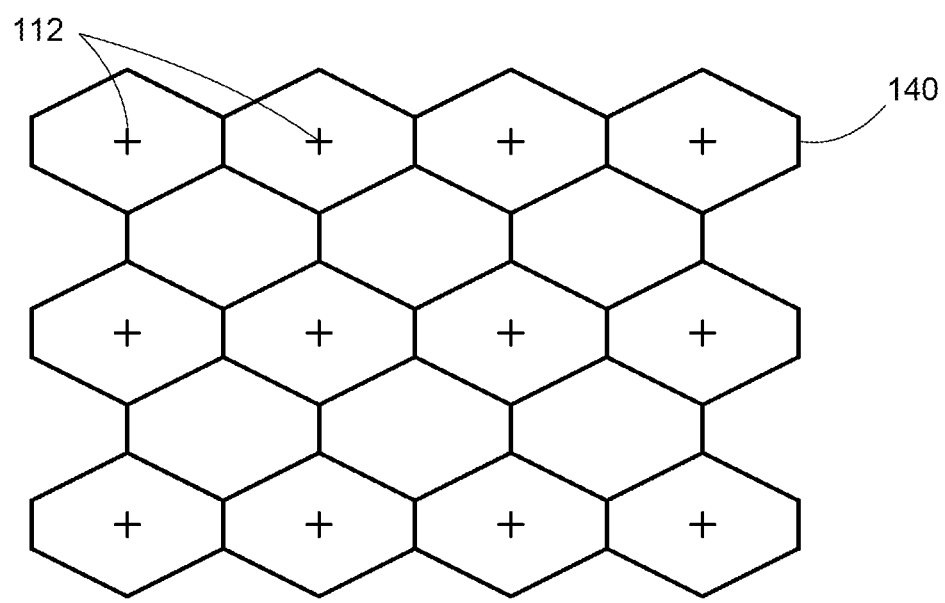
FIG. 1B depicts a honeycomb filler.

According to some embodiments and referring again to FIG. 4, bonding expansions 274 may be formed at rib intersections for the machined honeycomb structure that provide a greater surface area for bonding a bottom plate than conventional honeycomb structures used for conventional honeycomb tabletops (compare with FIG. 1B). In some cases, a surface area of the bonding expansions 274 may be increased for some of the intersections within the honeycomb structure. For example, some bonding expansions may be larger than others. The bonding expansions having increased size may be distributed (e.g., in a regular or semi-regular array) across the honeycomb area to improve adhesion of one or more bottom plates.

The inventors have further recognized and appreciated that different sized honeycomb structures may be patterned across the top body 202, as depicted in FIG. 4. For example some of the voids 276 may be larger than other voids. Additionally, shapes other than rectangles may be used. In some implementations, the honeycomb shapes and sizes may be designed to improve stiffness and/or damping characteristics of the tabletop, as compared to having a uniform honeycomb structure throughout the tabletop. Additionally, a thickness of the honeycomb ribbing 273 may be varied.

Figure 6:
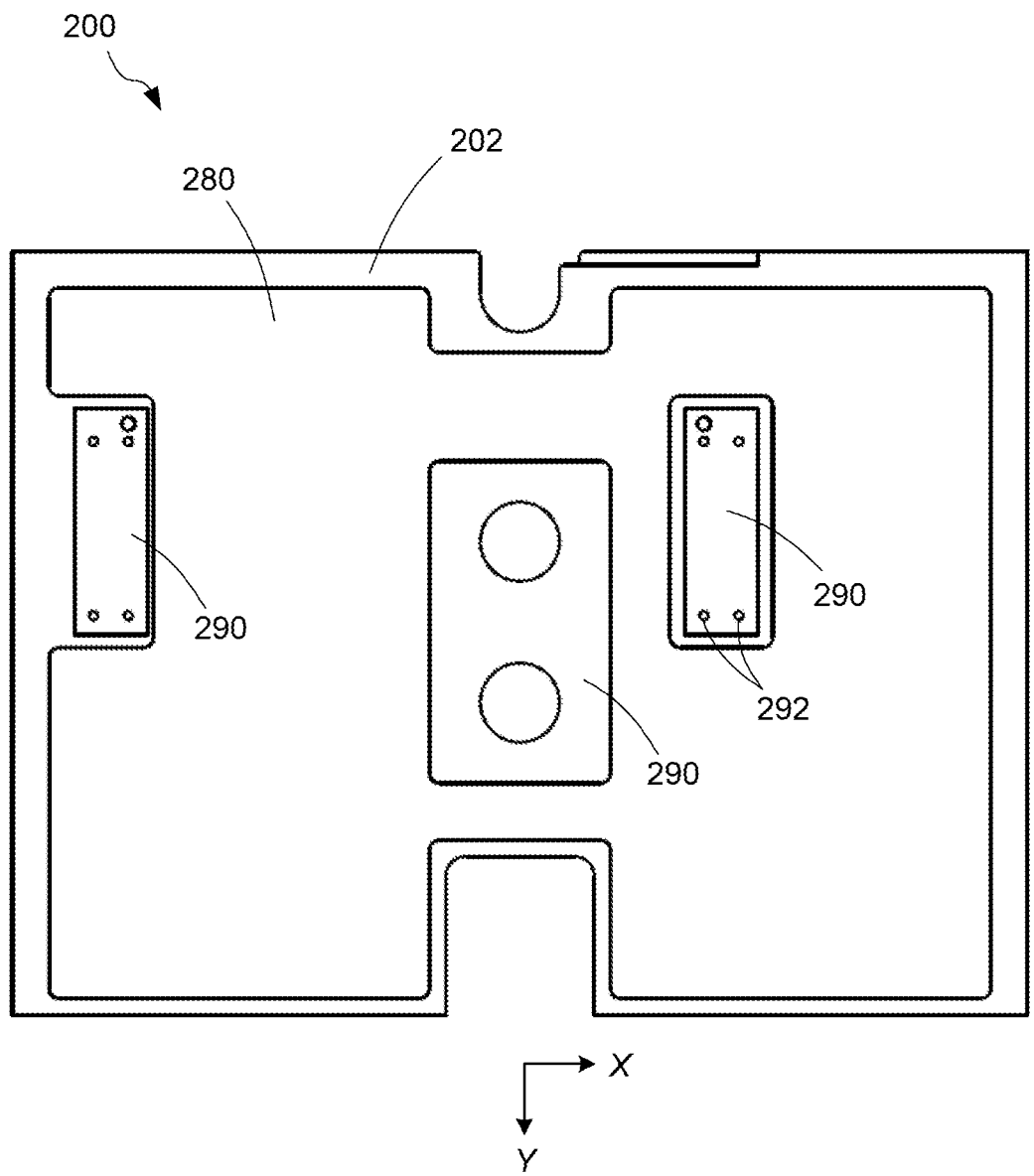
FIG. 6 depicts a bottom-side view of a precision optical tabletop with a bottom skin in place, according to some embodiments.

FIG. 6 depicts a bottom view of an assembled precision optical tabletop 200 with the bottom skin 280 attached. According to some implementations, the precision optical tabletop is formed from two pieces of material, a top body 202 and a bottom plate 280. In some cases, several bottom plates may be used to seal separated honeycomb regions. In some implementations, portions of the top body 202 form a bottom surface 290 of the precision tabletop. As can be seen in comparison with FIG. 2 and FIG. 4, some of the machined features 292 on the bottom surface (e.g., at a solid region 275) can be registered precisely to some of the machined features 212 on a top surface of the tabletop 200.

Because the top body 202 may include one or more top surfaces 210 and one or more bottom surface regions 290, the top and bottom surfaces can be made highly parallel through machining processes to meet demanding parallelism requirements between these surfaces. For example, after machining a bottom surface, the top body 202 may be turned over in the same tool to machine the top surface(s) parallel with the bottom surface(s) or vice versa. Additionally, edge surfaces of the tabletop 200 can also be machined from the same top body 202 to meet demanding tolerances for machined features located on the edge surfaces. In some implementations, machined features on any surface of the tabletop may be aligned to within ±0.005 inches of machined features on any other surface of the tabletop. Additionally, opposing surfaces of the tabletop may be made parallel to within ±0.01 radians. In some implementations, machined features on any surface of the tabletop may be aligned to within ±0.002 inches, or less, of machined features on any other surface of the tabletop. Additionally, opposing surfaces of the tabletop may be made parallel to within ±0.001 radians, or less. Such tolerances are not feasible with conventional honeycomb tabletop structures.

Figure 7:
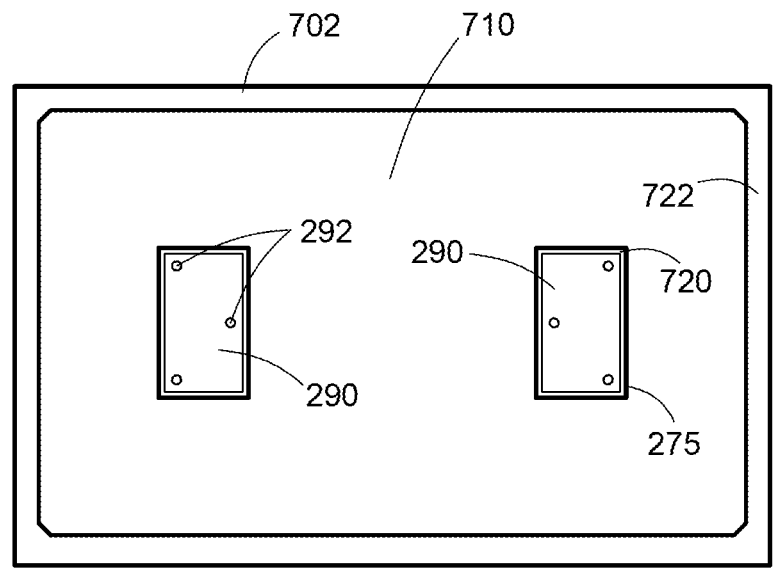
FIG. 7 depicts a bottom-side view of a top body of a precision optical tabletop, according to some embodiments in which a separate honeycomb structure is installed in the top body.
Figure 8:
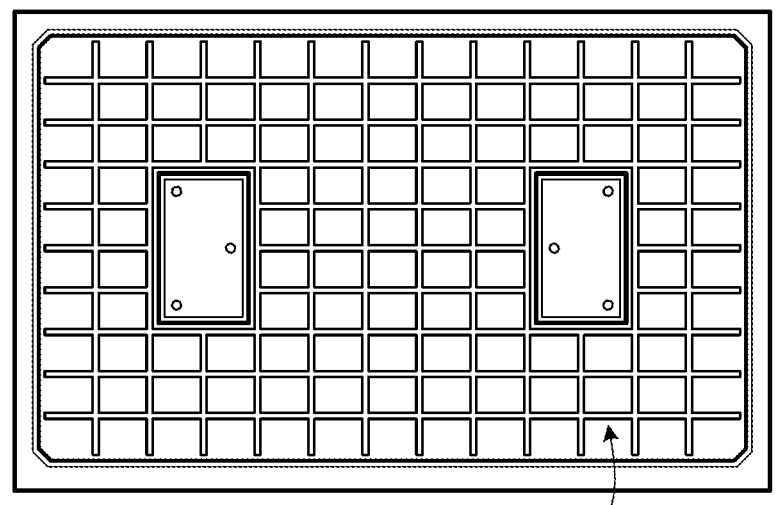
FIG. 8 depicts a bottom-side view of a top body with a honeycomb structure installed.

In some embodiments, a precision tabletop may be manufactured to the same tolerances using a separately formed honeycomb structure that is installed into the top body core, as depicted in FIG. 7 and FIG. 8. For example, one or more pockets 710 or void regions may be formed below a top surface of the top body, as depicted in the bottom-side view of FIG. 7. The one or more pockets may span more than 25% of the area of the top body 702. There may be one or more solid regions 275 left among the one or more pockets 710 at which a bottom surface 290 is machined to within a tight tolerance of the top surface, or vice versa. Machined features 292 may be formed on the bottom, side, and top surfaces with accurate registration to at least one machined feature on the top surface. Additional solid regions may be formed for blind holes located in the top surface of the top body, for example.

After forming the one or more pockets, a honeycomb structure 778 or any suitable stiffening material may be installed in the pocket(s). In some implementations, honeycomb structures 778 may be installed by adhering the honeycomb separately, or at a same time, to the top body 702 and a bottom cover (not shown). A bottom cover may adhere to a bottom-side of the honeycomb and/or a ledge 720 formed along solid regions 275 and a peripheral, bottom-side surface 722 of the top body. In some cases, the installable honeycomb structure may be formed from materials other than metal, such as polymer/glass composites, polymer/metal composites, wood (e.g., solid wood, plywood, laminated wood), fiberglass, cast resin, and metal foam.

A precision optical tabletop may be manufactured from a solid core for the top body 202 and one or more thin plates for the bottom cover(s) 280. In some embodiments, a top body core may be machined to form a honeycomb structure in at least one region of the top body core below a top surface of the top body core. In some implementations, a top body core may be machined to form one or more pockets below a top surface of the top body core into which one or more honeycomb structures may be installed. When machining the honeycomb cells or forming one or more pockets, one or more regions may not be machined as honeycomb cells and left as one or more solid regions spanning multiple honeycomb cell widths within the honeycomb structure. In some implementations, first features 212 may be machined on the top surface of the top body core, and second features 292 may be aligned and machined on a bottom surface of the one or more solid regions to be registered to at least one machined feature on the top surface. According to some embodiments, the bottom surface of the one or more solid regions may be machined to be parallel to, or at a desired angle with respect to, the top surface to within ±0.01 radians.

CONCLUSION

The terms "approximately" and "about" may be used to mean within ±20% of a target dimension in some embodiments, within ±10% of a target dimension in some embodiments, within ±5% of a target dimension in some embodiments, and yet within ±2% of a target dimension in some embodiments. The terms "approximately" and "about" may include the target dimension.

The technology described herein may be embodied as a method, of which at least some acts have been described. The acts performed as part of the method may be ordered in any suitable way. Accordingly, embodiments may be constructed in which acts are performed in an order different than described, which may include performing some acts simultaneously, even though described as sequential acts in illustrative embodiments. Additionally, a method may include more acts than those described, in some embodiments, and fewer acts than those described in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

The invention claimed is:

1. A precision tabletop comprising:
a top body having a top surface and a bottom surface;
a honeycomb structure having honeycomb cells located in the top body below the top surface;
a solid region formed in the top body and located within the honeycomb structure, wherein the solid region fills a volume that is greater than a volume of a cell of the honeycomb structure and extends from the top surface to the bottom surface of the top body;
a first machined feature formed on the bottom surface of the solid region that is registered to at least one machined feature formed on the top surface of the top body;
backing regions at first intersections of ribs in the honeycomb structure; and
blind holes formed in the backing regions.

2. The precision tabletop of claim 1, wherein the honeycomb structure and the solid region are formed into a same piece of material used to make the top body.

3. The precision tabletop of claim 1, further comprising a second machined feature formed on a side of the top body that is registered to one or more machined features formed on the top surface of the top body.

4. The precision tabletop of claim 1, wherein the top body is formed from a metal.

5. The precision tabletop of claim 1, wherein the honeycomb structure extends across at least one-quarter of a total area of the top body.

6. The precision tabletop of claim 1, wherein the honeycomb cells have different sizes and/or shapes in different regions of the top body.

7. The precision tabletop of claim 1, wherein ribs of the honeycomb cells have different thicknesses in different regions of the top body.

8. The precision tabletop of claim 1, further comprising one or more bottom plates adhered over the honeycomb structure.

9. The precision tabletop of claim 8, further comprising bonding expansions at one or more second intersections of the ribs in the honeycomb structure to which the one or more bottom plates are adhered.

10. The precision tabletop of claim 1, wherein the bottom surface of the solid region is parallel to the top surface of the top body to within ±0.01 radians.

11. A method of forming a precision tabletop, the method comprising:
   forming a honeycomb structure in at least one region of a top body core, wherein the honeycomb structure is formed below a top surface of the top body core;
   leaving a solid region spanning multiple honeycomb cell widths within the honeycomb structure;
   machining first features on the top surface of the top body core; and
   aligning and machining second features on a bottom surface of the solid region to be registered to at least one machined feature on the top surface.

12. The method of claim 11, wherein forming the honeycomb structure comprises forming backing regions at intersections of ribs of the honeycomb structure, and further comprising forming blind holes in the backing regions.

13. The method of claim 11, wherein forming the honeycomb structure comprises forming bonding expansions at intersections of ribs of the honeycomb structure, and further comprising adhering a bottom plate to the bonding expansions.

14. The method of claim 11, further comprising machining the bottom surface of the solid region to be parallel to the top surface within ±0.01 radians.

15. The method of claim 11, further comprising aligning and machining third features on a side surface to be registered to at least one machined feature on the top surface.

16. A precision tabletop comprising:
   a top body having a top surface and a bottom surface;
   a honeycomb structure having honeycomb cells located in the top body below the top surface;
   a solid region formed in the top body and located within the honeycomb structure, wherein the solid region fills a volume that is greater than a volume of a cell of the honeycomb structure and extends from the top surface to the bottom surface of the top body;
   a first machined feature formed on the bottom surface of the solid region that is registered to at least one machined feature formed on the top surface of the top body; and
   a second machined feature formed on a side of the top body that is registered to at least one machined feature formed on the top surface of the top body.

17. The precision tabletop of claim 16, wherein the honeycomb structure and the solid region are formed into a same piece of material used to make the top body.

18. The precision tabletop of claim 16, wherein the honeycomb cells have different sizes and/or shapes in different regions of the top body.

19. The precision tabletop of claim 16, further comprising bonding expansions at intersections of ribs in the honeycomb structure.

20. The precision tabletop of claim 16, wherein the bottom surface of the solid region is parallel to the top surface of the top body to within ±0.01 radians.

* * * * *